United States Patent Office 3,436,660
Patented Apr. 1, 1969

---

3,436,660
METHOD AND APPARATUS FOR DETERMINING THE SYMMETRY FACTOR OF A TRANSISTOR
Jiří Dostál, Prague, Czechoslovakia, assignor to Vyzkumny ustav matematickych stroju, Prague, Czechoslovakia
Filed Oct. 22, 1965, Ser. No. 504,292
Claims priority, application Czechoslovakia,
Nov. 4, 1964, 6,126/64
Int. Cl. G01r 27/02
U.S. Cl. 324—158
6 Claims

ABSTRACT OF THE DISCLOSURE

A method and apparatus for measuring the symmetry factor of a transistor wherein the transistor is connected in a bridge circuit such that the base-emitter and base-collector junctions form two arms of the bridge, the two remaining bridge arms consisting of a fixed and an adjustable resistor. The adjustable resistor is varied to obtain a null at the output terminals of the bridge whereby its value at null is determinative of the symmetry factor.

---

This invention relates to semiconductors, and particularly to a method and apparatus for measuring the symmetry factor of a transistor.

The degree of symmetry of transistors is a criterion of quality which is of interest to manufacturers as well as to users of transistors. It is commonly expressed by the symmetry factor $k$ which is defined by the equation $$k = \beta_N / \beta_I$$

wherein $\beta_N$ and $\beta_I$ are the respective direct-current amplification factors of the emitter circuit and of the inverse collector circuit.

The symmetry factor $k$ has heretofore been calculated from several individual measurements from which the two amplification factors could be derived.

$\beta_N$ is the normal short-circuit current-gain factor in the common emitter connection and equals $I_C/I_B$ at $V_{CB}=0$.

$\beta_I$ is the inverse short-circuit current-gain factor in the common collector connection and equals $I_E/I_B$.

The equation $$k = \frac{\beta_N}{\beta_I} = \frac{R_E}{R_Q}$$

may be proven. At balance, the collector and emitter are at equal potential and the current $I_B$ of the battery B divides in both resistors $R_E$ and $R_C$ by the ratios $$I_C = I_B \frac{R_E}{R_C + R_E}$$

and $$I_E = I_B \frac{R_C}{R_C + R_E} \quad (1)$$

wherein $I_C$ and $I_E$ are the collector current and emitter current, respectively, of the transistor T. In accordance with the well-known Ebers-Moll model of the transistor, the voltages at the collector and emitter junctions are $$V_{CB} = V_T \log \left[1 + \frac{I_C + \alpha_N I_E}{I_{CO}}\right]$$

$$V_{EB} = V_T \log \left[1 + \frac{I_E + \alpha_I I_C}{I_{EO}}\right] \quad (2)$$

wherein
$V_{CB}$ is the collector-to-base voltage,
$V_{EB}$ is the emitter-to-base voltage,
$\alpha_N$ is the normal short-circuit current-gain factor in the common base connection, $$\alpha_N = I_C/I_E \text{ at } V_{CB}=0$$

$\alpha_I$ is the inverse short-circuit current-gain factor in the common base connection, $$\alpha_I = I_E/I_C \text{ at } V_{EB}=0$$

$I_{CO}$ is the reverse saturation current at the collector junction, $$I_{CO} = -I_C \text{ at } V_{CB}=-\infty, I_E=0$$

$I_{EO}$ is the reverse saturation current at the emitter junction, $$E_{EO} = -I_E \text{ at } V_{EB}=-\infty, I_C=0$$

$V_T$ is the thermal voltage, that is the ratio of the Boltzmann's constant and the absolute temperature to the electron charge.

The two junction voltages $V_{CB}$ and $V_{EB}$ are equal when $$\frac{I_C + \alpha_N I_E}{I_{CO}} = \frac{I_E + \alpha_I I_C}{I_{EO}} \quad (3)$$

Using Equation 1 with respect to the reciprocity relation, $$\alpha_N I_{EO} = \alpha_I I_{CO} \quad (4)$$

It follows from Equation 3 that $$\frac{R_E}{R_C} = \frac{\alpha_N(1-\alpha_I)}{\alpha_I(1-\alpha_N)} \quad (5)$$

Equation 5 is in agreement with the principal equation $$\frac{R_E}{R_C} = \frac{\beta_N}{\beta_I} = k$$

since by definition $$\beta_N = \frac{\alpha_N}{1-\alpha_N}$$

and $$\beta_I = \frac{\alpha_N}{1-\alpha_I}$$

The known method is obviously cumbersome since it requires a multitude of individual measurements to be made which in themselves are of no value. The calculations involved are simple in themselves, but make it difficult to employ the known method in the inspection of transistors on an industrial scale. While the known method is capable of being automatized, the circuitry needed is rather complex.

It is the primary object of the invention to provide a method which provides the value of $k$ directly in a single measuring operation.

Another object is the provision of apparatus for performing the method.

With these and other objects in view, the invention in one of its aspects resides in a bridge circuit whose four branches are respectively formed by a fixed resistor, a calibrated variable resistor, and the emitter and collector junctions of the transistor to be tested. The bridge is energized by a source of direct current, and the variable resistor is adjusted until the emitter and the collector lead of the transistor tested are at equal potential.

Other features and many of the attendant advantages of this invention will be readily appreciated from the following detailed description of preferred embodiments when considered with the accompanying drawing in which.

Figure 1:
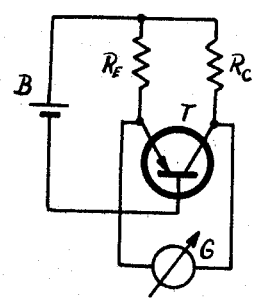
FIG. 1 illustrates the basic bridge circuit arrangement of the invention by a conventional diagram.

Referring initially to FIG. 1, there is shown a transistor T whose base is connected to one pole of a battery B, whereas the emitter and collector of the transistor are respectively connected to the other battery pole by resistors $R_E$ and $R_C$. A sensitive galvanometer G connects the emitter and collector leads of the transistor T.

The galvanometer shows zero voltage when the following equation is satisfied:

$$k = \frac{R_E}{R_C} = \frac{\beta_N}{\beta_I}$$

The invention is based on the finding that $k$ is uniquely related to the variable resistance value of one of the resistors $R_E$ or $R_C$ at zero indication of the galvanometer G when the other resistor has a fixed value, and can therefore be read directly from the suitably calibrated scale of the variable resistor.

Figure 2:
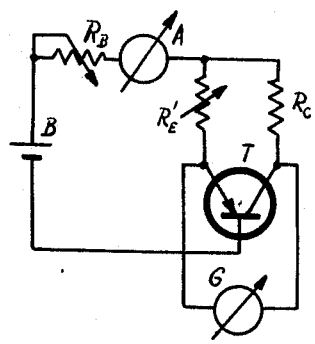
FIG. 2 shows an embodiment of the invention equipped for manual balancing of its bridge circuit.

The embodiment of the invention whose circuit diagram is shown in FIG. 2 is a laboratory instrument for determining the symmetry factor of transistors, and has a bridge circuit which is to be balanced by hand.

The circuit shown in FIG. 2 differs from the basic circuit of FIG. 1 by the provision of a variable resistor $R_E'$ interposed between the battery B and the emitter of the transistor T which is being tested. The battery lead further is equipped with a variable resistor $R_B$ and a milliammeter A for adjusting and indicating the base current of the transistor which is about equal to twice the emitter current or collector current when the symmetry factor $k$ is near one.

The resistor $R_B$ is selected so that its resistance is much higher than that of the variable resistor $R_E'$ and the fixed resistor $R_C$ arranged in parallel so that the variation of the base current by adjustment of the resistor $R_E'$ is not significant. A decade resistor is preferably used for the resistor $R_E'$. If the galvanometer G has a voltage constant $c_u$ of $10^{-6}$ v./mm., and the fixed resistor $R_C$ is 10 kilohms, the symmetry factor can be read directly to three valid decimal digits from the decade resistor $R_E'$.

Figure 3:
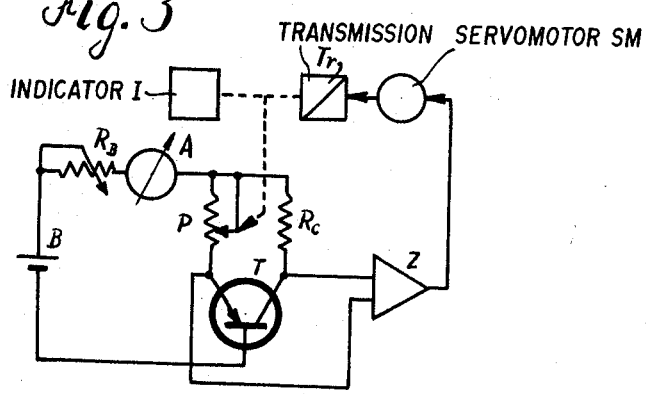
FIG. 3 illustrates another embodiment having a self-balancing bridge circuit.

A self-balancing bridge circuit is shown in FIG. 3. The galvanometer G of the device shown in FIG. 2 is replaced by a sensitive D.C. amplifier Z whose output is being fed to a servomotor SM. The output shaft of the latter is connected to the movable contact of a potentiometer P which replaces the variable resistor $R_E'$ in the circuit of FIG. 2. The movable contact of the potentiometer P is conductively connected to one of the fixed terminals of the potentiometer. A gear transmission $Tr$ is interposed between the servomotor SM and the potentiometer P. An indicator I coupled to the output shaft of the transmission $Tr$ indicates the position of the movable potentiometer contact, and its scale can be directly calibrated in units of symmetry factor $k$.

The apparatus illustrated in FIG. 3 requires an operator merely to connect the base, collector, and emitter of the transistor T to be tested to the battery B and to the terminals of the potentiometer P and of the fixed resistor $R_C$ which are connected to the input terminals of the amplifier Z. The symmetry factor $k$ of the transistor T may then be read directly from the indicator I.

It will be understood that the output of the amplifier Z is connected to the servomotor SM in such a manner that the output shaft of said servomotor will rotate in a direction to reduce the input voltage.

In testing a transistor of type OC141 in an arrangement as shown in FIG. 2, the battery B had a nominal output voltage of 12 volts, and the resistors $R_B$, $R_E'$, and $R_C$ were of 120, 10, 10 kilohms, respectively. The current indicated on the milliammeter A was adjusted to 0.1 ma. by adjusting the resistance of $R_B$.

When a transistor of type OC44 was tested in an arrangement whose general circuit is indicated in FIG. 3, the resistances of $R_B$, P, and $R_C$ were, respectively, 33, 20, and 1 kilohm, and the base current was adjusted to 0.5 ma. The amplifier Z had a gain of 1000, and rotated the servomotor SM through an angle of 4 degrees per millivolt of applied input potential. The transmission $Tr$ was a reducing gear having a ratio of 10:1 and was directly coupled to the indicator I and the drive shaft of the potentiometer P.

The illustrated embodiments of the invention are capable of many modifications which will be obvious from the above teachings. The resistor interposed between the emitter of the transistor T and the battery B has been shown to be variable, but the resistance of the collector circuit may be varied instead without altering the operation of the devices shown. Similarly, the current limiting resistor $R_B$ and/or the milliammeter A may be arranged in circuit between the base of the transistor T and the battery B. The apparatus is suitable not only for determining the symmetry factor of the illustrated P-N-P transistor, but may be employed with any other type of transistor which has a base, a collector, and an emitter.

What is claimed is:

1. A method of determining the symmetry factor of a transistor having a base, an emitter, and a collector, which comprises:
    (a) connecting the base of said transistor to one pole of a source of current connected so that the emitter-base and collector-base junctions are connected in the forward direction;
    (b) respectively connecting the emitter and collector of said transistor to the other pole of said source through two resistors;
    (c) connecting between the emitter and collector of said transistor a signal device for generating a signal in response to the voltage between said emitter and said collector; and
    (d) adjusting the resistance of one of said resistors until said signal device indicates that said emitter and said collector are at equal potential,
        (1) whereby the ratio of the resistances of said resistors is numerically equal to the symmetry factor of said transistor.

2. A method as set forth in claim 1, wherein the other one of said two resistors has a fixed resistance, the method further comprising the step of visually indicating the resistance of said one resistor after said adjusting thereof.

3. An apparatus for measuring the symmetry factor of a transistor having a base, an emitter, and a collector which comprises:
    (a) a source of current having two poles;
    (b) first conductive means connecting one of said poles to the base of said transistor whose symmetry factor is to be measured;
    (c) two resistor means, each resistor means having a first and a second terminal;
    (d) second conductive means connecting said first terminals to the other pole of said source;
    (e) third and fourth conductive means respectively connecting said second terminals to the emitter and the collector of said transistor;
    (f) adjusting means for varying the resistance between the terminals of one of said resistor means;
    (g) signal generating means for generating a signal in response to the voltage between said second terminals; and
    (h) indicating means for indicating said resistance of said one resistor means as an indication of said symmetry factor.

4. An apparatus as set forth in claim 3, further comprising means in one of said first and second conductive means for varying the current of said source.

5. An apparatus as set forth in claim 4, further comprising meter means in one of said first and second conductive means for measuring the current of said source.

6. An apparatus as set forth in claim 3, wherein said adjusting means include means responsive to said signal for varying the resistance of said one resistor means until said voltage is zero.

References Cited

UNITED STATES PATENTS 2,786,169  3/1957  Muffly _____ 324—99 XR
3,363,178  1/1968  Blanc _____ 324—158

RUDOLPH V. ROLINEC, *Primary Examiner.*

E. L. STOLARUN, *Assistant Examiner.*

U.S. Cl. X.R.

324—62